United States Patent
Mirza

(10) Patent No.: US 12,284,140 B2
(45) Date of Patent: Apr. 22, 2025

(54) TDD-TO-FDD HANDOVER BASED ON SERVICE TYPE AND UPLINK QUALITY

(71) Applicant: T-Mobile USA, Inc., Bellevue, WA (US)

(72) Inventor: Mochamad Mirza, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 103 days.

(21) Appl. No.: 18/090,318

(22) Filed: Dec. 28, 2022

(65) Prior Publication Data

US 2023/0142031 A1    May 11, 2023

Related U.S. Application Data

(63) Continuation of application No. 17/187,495, filed on Feb. 26, 2021, now Pat. No. 11,641,609.

(51) Int. Cl.
    *H04L 5/14*      (2006.01)
    *H04W 36/08*     (2009.01)
    (Continued)

(52) U.S. Cl.
    CPC ............ *H04L 5/14* (2013.01); *H04W 36/24* (2013.01); *H04W 36/08* (2013.01); *H04W 36/144* (2023.05); *H04W 36/304* (2023.05)

(58) Field of Classification Search
    CPC ............................ H04W 36/30; H04L 5/14
    See application file for complete search history.

(56) References Cited

U.S. PATENT DOCUMENTS

| 9,301,295 | B1 * | 3/2016 | Singh | H04W 76/20 |
| 10,541,716 | B1 * | 1/2020 | Vazny | H04B 1/18 |

(Continued)

FOREIGN PATENT DOCUMENTS

| WO | WO2005032172 A1 | 4/2005 | |
| WO | WO2012118839 A9 | 9/2012 | |
| WO | WO-2016003113 A1 * | 1/2016 | H04W 36/02 |

OTHER PUBLICATIONS

The Extended European Search Report Mailed Jul. 21, 2022 for European Patent Applciation No. 22154073.5, 11 pages.

(Continued)

*Primary Examiner* — Kodzovi Acolatse
*Assistant Examiner* — Anindita Sen
(74) *Attorney, Agent, or Firm* — Lee & Hayes, P.C.

(57) ABSTRACT

Described herein are techniques and systems for selectively transitioning communication sessions from TDD to FDD based on service type and uplink quality. The selective transitioning of communication sessions from TDD to FDD can provide higher and more reliable uplink throughput to UEs, as needed. An example process includes determining, during setup of a communication session for a UE using TDD, a type of service associated with the communication session, and determining that the type of service is a predefined service of a set of predefined services. The example process may further include determining a value indicative of a quality associated with an uplink connection established by the UE, determining that the value fails to satisfy a threshold value, and transitioning, based at least in part on the value failing to satisfy the threshold value, the communication session to a target base station to finish the setup using FDD.

20 Claims, 5 Drawing Sheets

(51) Int. Cl.
*H04W 36/14* (2009.01)
*H04W 36/24* (2009.01)
*H04W 36/30* (2009.01)

(56) References Cited

U.S. PATENT DOCUMENTS

| | | | |
|---|---|---|---|
| 11,026,212 B1* | 6/2021 | Pawar | H04W 72/21 |
| 11,388,723 B2* | 7/2022 | Zhou | H04W 72/21 |
| 2015/0092630 A1 | 4/2015 | Lin et al. | |
| 2015/0341834 A1 | 11/2015 | Lee et al. | |
| 2016/0014753 A1* | 1/2016 | Wu | H04L 27/2607 |
| | | | 370/280 |
| 2016/0073299 A1* | 3/2016 | Liang | H04L 12/1407 |
| | | | 370/331 |
| 2016/0112178 A1* | 4/2016 | Yi | H04W 72/23 |
| | | | 370/280 |
| 2019/0363843 A1* | 11/2019 | Gordaychik | H04L 1/08 |
| 2020/0344696 A1* | 10/2020 | Vivanco | H04W 52/243 |
| 2022/0077975 A1* | 3/2022 | Rudolf | H04W 72/20 |
| 2022/0201676 A1* | 6/2022 | Kumar | H04W 76/15 |
| 2022/0216958 A1* | 7/2022 | Rudolf | H04L 5/003 |
| 2022/0216964 A1* | 7/2022 | Mondal | H04L 5/0051 |
| 2022/0279413 A1 | 9/2022 | Mirza | |

OTHER PUBLICATIONS

Office Action for U.S. Appl. No. 17/187,495, mailed on Jul. 21, 2022, Mirza, "TDD-to-FDD Handover Based on Service Type and Uplink Quality", 13 pages.

\* cited by examiner

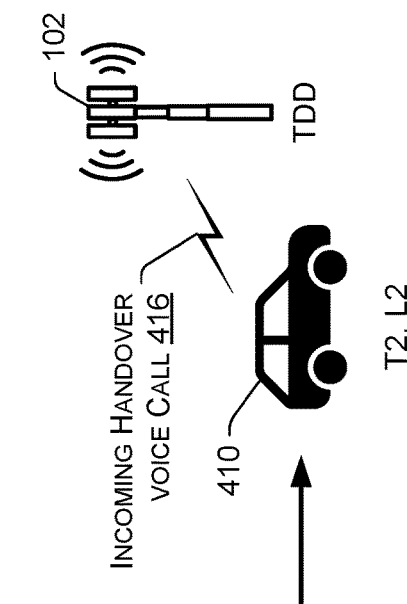
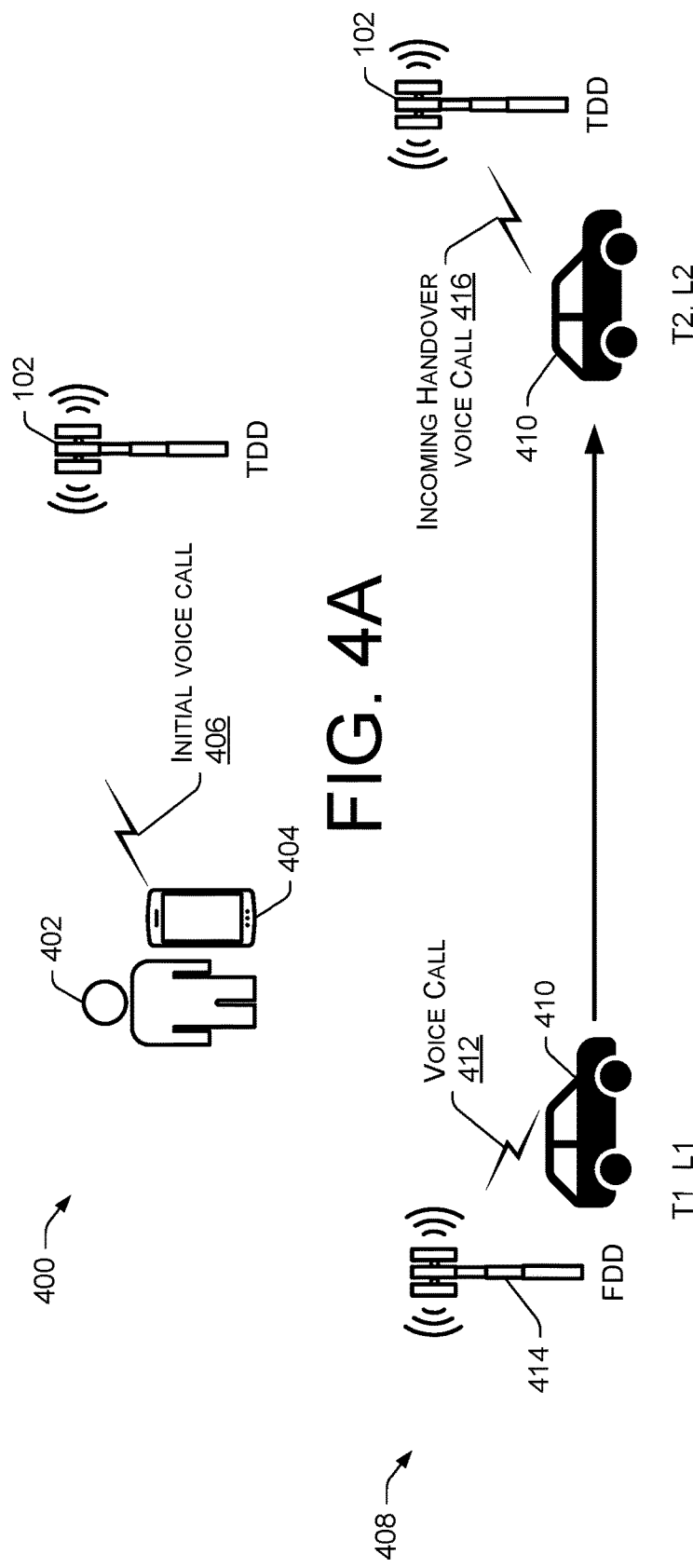
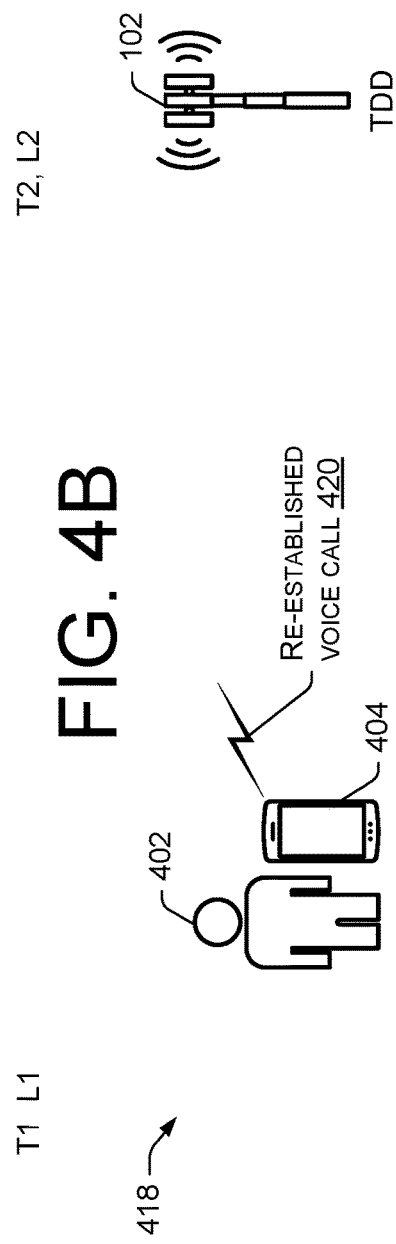

TDD-TO-FDD HANDOVER BASED ON SERVICE TYPE AND UPLINK QUALITY

CROSS REFERENCE TO RELATED APPLICATIONS

This application is a continuation of and claims priority to commonly assigned, co-pending U.S. patent application Ser. No. 17/187,495, filed Feb. 26, 2021. application Ser. No. 17/187,495 is fully incorporated herein by reference.

BACKGROUND

Time-division duplexing (TDD) is a data transmission scheme for providing duplex communication where uplink transmissions are separated from downlink transmissions by the allocation of different time slots in the same frequency band. Some wireless carriers (or operators) utilize particular frequency bands with a TDD data transmission scheme. For example, TDD is used on Band 41 in fourth generation (4G) Long Term Evolution (LTE), and on the n41 band in fifth generation (5G) new radio (NR). One issue with employing TDD in mobile networks, especially mid-band and high-band TDD, is that the uplink quality is oftentimes much worse than the downlink quality. As a result, some user equipment (UEs), while using TDD, may be unable to access certain types of services, such as conversational voice, conversational video (live streaming), and mission-critical push to talk (MCPTT), among others. Nevertheless, carriers may still find it advantageous to employ TDD in their networks.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 4A-C illustrate example scenarios that can trigger a process for selectively transitioning a communication session from TDD to FDD, in accordance with various embodiments.

DETAILED DESCRIPTION

Figure 1:
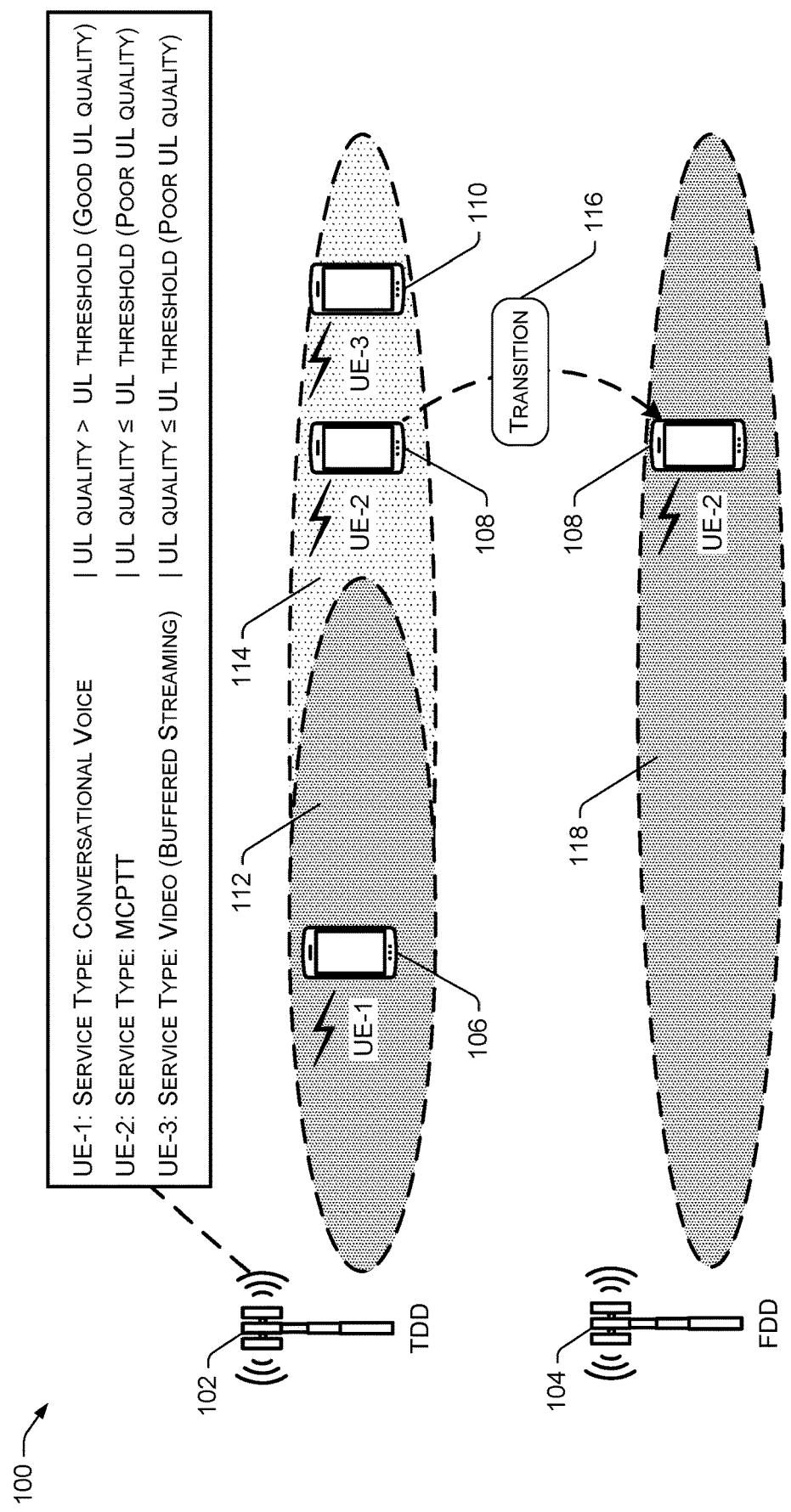
FIG. 1 is an example diagram illustrating a technique for selectively transitioning communication sessions from TDD to frequency-division duplexing (FDD) based on service type and uplink quality, in accordance with various embodiments.

Wireless carriers (or "operators") provide their users (sometimes called "subscribers" or "customers") with access to a variety of types of services over a telecommunication network. Users expect to be able to access those services with adequate Quality of Service (QOS) whenever they are within a coverage area of the carrier's network. Carriers may also utilize different data transmission schemes to provide duplex communication in their networks. Two exemplary types of data transmission schemes are time-division duplexing (TDD) and frequency-division duplexing (FDD).

As noted above, in TDD, uplink transmissions are separated from downlink transmissions by the allocation of different time slots in the same frequency band. For example, the same frequency band is used for transmitting and receiving in TDD. Thus, in the downlink direction, a base station transmits a signal to a user equipment (UE) on a particular frequency band (e.g., 2.5 Gigahertz. (GHz)), and in the uplink direction, the UE transmits a signal to the base station on the same frequency band (e.g., 2.5 GHZ).

In FDD, by contrast, the transmitter and the receiver operate using different frequency bands. For example, in the downlink direction, the base station transmits a signal to the UE on a first frequency band, while in the uplink direction, the UE transmits a signal to the base station on a second frequency band different than the first frequency band. Thus, in FDD, the UE and the base station each transmit and receive using different carrier frequencies.

There are also differences in the uplink and downlink coverage between TDD and FDD. For instance, in FDD, the signal strength in the downlink direction is roughly the same as the signal strength in the uplink direction. By contrast, in TDD, especially mid-band and high-band TDD, the signal strength in the downlink direction can be much stronger than the signal strength in the uplink direction, which may be due, at least in part, to the strong transmit power of the base station and a disproportion in the uplink and downlink timeslot allocation, as well as reduced downlink interference. This creates a significant gap in the signal strength between the downlink and the uplink coverage when TDD is employed as the data transmission scheme. For example, in a TDD coverage area, a 16 decibel (dB) gap has been observed between downlink coverage and uplink coverage for 5G NR at 3.5 GHZ. Accordingly, UEs, while using TDD, may be unable to access services that require high and reliable uplink throughput.

Described herein are techniques and systems for selectively transitioning (or handing over) communication sessions from TDD to FDD based on service type and uplink quality. The selective transitioning of these communication sessions from TDD to FDD can provide higher and more reliable uplink throughput to UEs, as needed. An example algorithm for selectively transitioning a communication session from TDD to FDD may be implemented by a system (e.g., a base station), and the algorithm may execute during setup (e.g., during bearer setup) of a communication session for a UE.

For example, during the setup of a communication session for a UE, a system may evaluate a type of service associated with the communication session to determine if the type of service is a predefined service of a set of predefined services. The set of predefined services may include one or more types of services that are considered to be "heavy uplink" services, or services that require high and reliable uplink throughput. The set of predefined services may additionally, or alternatively, include one or more types of services with roughly the same data rates in both the uplink and downlink directions. Examples of types of services that may be included in the set of predefined services include, without limitation, conversational voice, conversational video (live streaming), and/or mission critical push to talk (MCPTT).

The system may evaluate the type of service in various ways. For example, in LTE, a QoS Class Identifier (QCI) can be used as a proxy for determining the type of service the UE is trying to access. In 5G NR, a 5G QOS Identifier (5QI) can be used as a proxy for determining the type of service the UE is trying to access. Accordingly, in some embodiments, the system may determine either the QCI value or the 5QI value associated with the communication session that is being setup, and then determine whether the QCI value or the 5QI value matches a predefined value of a set of predefined values corresponding to the services in the set of predefined services.

If the type of service associated with the communication session is a predefined service of the set of predefined services, the system may evaluate the quality associated with an uplink connection established by the UE to determine if the communication session should be transitioned (or handed over) to a target base station to finish the setup of the communication session using FDD. Accordingly, the system may determine a value indicative of a quality associated with an uplink connection established by the UE, and then determine whether the value satisfies a threshold value. As used herein, a value can "satisfy" a threshold value if the value is equal to or greater than the threshold value, or if the value is strictly greater than the threshold value. Accordingly, a value can "fail to satisfy" a threshold value if the value is less than or equal to the threshold value, or if the value is strictly less than the threshold value.

In some embodiments, the quality associated with the uplink connection established by the UE may be determined by measuring a signal-to-interference-plus-noise ratio (SINR) value associated with the uplink connection. In general, the measured SINR value in the uplink direction will decrease as the UE moves farther away from the serving base station. Accordingly, if a value (e.g., the SINR value) indicative of the quality associated with the uplink connection fails to satisfy a threshold value (e.g., a threshold SINR value), the system may transition (or handover) the communication session to a target base station to finish setting up the communication session using FDD. If, on the other hand, the value (e.g., the SINR value) indicative of the quality associated with the uplink connection satisfies the threshold value (e.g., the threshold SINR value), the system may continue setting up the communication session using TDD on the serving base station.

An example process includes determining, during setup of a communication session for a UE using TDD, a type of service associated with the communication session, and determining that the type of service is a predefined service of a set of predefined services. The example process may further include determining a value indicative of a quality associated with an uplink connection established by the UE, determining that the value fails to satisfy a threshold value, and transitioning, based at least in part on the value failing to satisfy the threshold value, the communication session to a target base station to finish the setup using FDD.

Also disclosed herein are systems comprising one or more processors and one or more memories, as well as non-transitory computer-readable media storing computer-executable instructions that, when executed, by one or more processors perform various acts and/or processes disclosed herein.

By implementing a TDD-to-FDD handover procedure that evaluates the type of service being accessed as well as the quality of the uplink connection established by the UE, a UE can be selectively transitioned to FDD if continuing to setup the communication session on TDD would otherwise result in a degradation, or a loss, of service for the UE. Meanwhile, if the UE is trying to access a service that does not require a high and reliable uplink throughput, or if the uplink connection established by the UE while using TDD is of sufficient quality for providing the UE access to a "heavy uplink" service with an adequate QoS, the setup of the communication session can be completed using TDD, thereby conserving resources by refraining from handing the session over to FDD on a target base station. Furthermore, the techniques and systems described herein allow wireless carriers to continue availing themselves of the benefits of using TDD, instead of altogether avoiding the use of TDD as a means of circumventing the potential uplink quality issues associated with TDD, as described herein. The techniques, devices, and systems described herein may further allow one or more devices to conserve resources with respect to processing resources, memory resources, networking resources, power resources, etc., in the various ways described herein. For example, by selectively transitioning communication sessions from TDD to FDD to improve uplink throughput, a UE and/or a base station may conserve processing resources, battery power, and the like by avoiding frequent retries to re-establish a communication session using TDD, which may occur if sessions were blindly setup on TDD without concern for the type of service or the uplink quality while using TDD.

FIG. 1 is an example diagram illustrating a technique for selectively transitioning communication sessions from Time-division duplexing (TDD) to frequency-division duplexing (FDD) based on service type and uplink quality, in accordance with various embodiments. FIG. 1 illustrates a cellular network environment 100 including a first base station 102 employing TDD as a data transmission scheme, and a second base station 104 employing FDD as a data transmission scheme. Each of the base stations 102 and 104 may comprise any suitable type of cellular-based, and/or wireless-based, access point (e.g., an E-UTRAN Node B (eNodeB or eNB), a Next Generation Node B (gNB), etc.). In accordance with various embodiments described herein, the terms "cell site," "cell tower," "base station," "eNodeB," "eNB," and "gNB" may be used interchangeably herein to describe any base station capable of performing the techniques and processes described herein. Each of the base stations 102 and 104 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), Voice over LTE (VOLTE), voice over New Radio (VONR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

FIG. 1 also depicts multiple different UEs including a first UE 106 (sometimes referred to herein as "UE-1"), a second UE 108 (sometimes referred to herein as "UE-2"), and a third UE 110 (sometimes referred to herein as "UE-3"). An individual UE may be implemented as any suitable computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar UE. In accordance with various embodiments described herein, the terms "wireless communication device," "wireless device," "communication device," "mobile device," "computing device," "electronic device," "user device," and "user equipment (UE)" may be used interchangeably herein to describe any UE capable of performing the techniques and processes described herein. Each of the UEs 106, 108, and 110 may be capable of communicating wirelessly using any suitable wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VOIP, VOLTE, VONR—e.g., 5G, IEEE 802.1x protocols, WiMAX, Wi-Fi, DOCSIS, DSL, and/or any future IP-based network technology or evolution of an existing IP-based network technology.

Referring to FIG. 1, the base station 102, at a given point in time, may act as a "serving base station" (or "serving cell") for each of the UEs 106, 108, and 110, meaning that the base station 102 may be currently providing the UEs 106, 108, and 110 with access to a telecommunication network, and/or that the base station 102 may be actively setting up a communication session for the UEs 106, 108, and 110 to provision such network access. In the illustrative example of FIG. 1, the first UE 106 (UE-1) may be attempting to setup a voice call (e.g., a VOLTE call, a VoNR call, etc.). Meanwhile, the second UE 108 (UE-2) may be attempting to setup a MCPTT session, and the third UE 110 (UE-3) may be attempting to setup a video (buffered streaming) session. The base station 102 may be configured to execute an algorithm with respect to each UE 106, 108, and 110, whereby the algorithm selectively transitions respective communication session for the individual UEs to a target base station, such as the base station 104, to finish the setup of the communication session using FDD. "Selectively" transitioning, as used herein, means that some communication sessions may be transitioned from TDD to FDD while other sessions may not be transitioned from TDD to FDD. The determination of whether to transition a communication session to FDD or not can be based at least in part on the type of service the UE is trying to access and potentially on the quality of the uplink connection established by the UE.

To illustrate, and taking each UE in turn, a user of the first UE 106 may dial a phone number (e.g., a 10 digit number in the United States) in order to setup a voice call. In response, the first UE 106 may initiate various setup procedures (e.g., signaling transmitted between the UE 106 and the base station 102) to setup the voice call. At least some of these setup procedures may comprise bearer setup procedures, such as establishing a dedicated bearer (e.g., a dedicated evolved packet system (EPS) bearer). For example, bearer setup may include signal transmissions between the UE 106 and the base station 102 to establish a radio resource control (RRC). The UE 106 may also transmit a signal to reserve a QoS Class Identifier (QCI) value or a 5G QOS Identifier (5QI) value for the type of service the UE 106 is trying to access. For example, the first UE 106 may transmit a signal to reserve a QCI value or a 5QI value of 1, and this may trigger a dedicated bearer establishment after the RRC establishment.

During the setup of the communication session (e.g., during the bearer setup), the base station 102 and/or an associated system may determine a type of service associated with the communication session. In this example, since the first UE 106 is attempting to setup a voice call, the type of service may be determined as a conversational voice service. The base station may then determine whether the type of service is a predefined service of a set of predefined services. For example, the base station 102 and/or an associated system may maintain a set (e.g., a list) of predefined services that are considered to be "heavy uplink" services, or services that require high and reliable uplink throughput. The set of predefined services may additionally, or alternatively, include one or more types of services with roughly the same data rates in both the uplink and downlink directions. In an illustrative example, the set of predefined services maintained by the base station 102 may include, without limitation, conversational voice, conversational video (live streaming), and/or MCPTT. Accordingly, the base station 102 may determine that the first UE 106 is attempting to access a conversational voice type of service, and may determine that conversational voice is in the set of predefined services.

In some embodiments, the base station 102 and/or an associated system may determine a QCI value or a 5QI value associated with the communication session, and may use the QCI/5QI value as a proxy for determining the type of service the first UE 106 is attempting to access. The QCI/5QI value may be a scalar number, each different scalar number being associated with a different Packet Delay Budget value and Packet Loss Rate value, as well as other QoS-related parameters. In some embodiments, the QCI/5QI value may be within a range of values (e.g., from 0 to 85). A QCI/5QI value of 1 may correspond to conversational voice. Thus, the base station 102 and/or an associated system may maintain a set (e.g., a list) of predefined QCI/5QI values that correspond to the set of predefined services, and if the QCI/5QI value associated with the communication session matches a predefined QCI/5QI value of the set of predefined QCI/5QI values, a determination can be made that the first UE 106 is attempting to access one of the predefined services.

In an illustrative example, a set of predefined QCI/5QI values may include, without limitation, 1 (conversational voice), 2 (conversational video (live streaming), and 65 (MCPTT). With respect to the first UE 106, the base station 102 and/or an associated system may determine that the communication session is associated with a QCI/5QI value of 1, thereby indicating that the first UE 106 is attempting to access a conversational voice type of service.

After determining that the first UE 106 is attempting to access conversational voice (which may be a predefined service in the set of predefined services), the base station 102 and/or an associated system may determine a value indicative of a quality associated with an uplink connection established by the first UE 106, and then determine whether the value satisfies a threshold value. In some embodiments, the value indicative of the uplink quality may comprise a signal-to-interference-plus-noise ratio (SINR) value associated with an uplink connection established by the first UE 106. In the example of FIG. 1, the first UE 106 is within a coverage area 112 associated with good (e.g., above-threshold) downlink (DL) quality and good (e.g., above-threshold) uplink (UL) quality. For example, the base station 102 and/or an associated system may measure the SINR value associated with the uplink connection established by the first UE 106, and may determine that the SINR value a threshold SINR value. In some embodiments, the threshold SINR value may be 15 decibels (dB). The SINR value associated with the first UE 106 may satisfy the threshold SINR value in part because the first UE 106 is in relatively close proximity to (within a threshold distance from) the base station 102. Because the value indicative of a quality associated with an uplink connection established by the first UE 106 satisfies the threshold value, there is no need to transition (or handover) the voice call to the target base station 104 because the uplink quality is sufficient for supporting the anticipated data rate in the uplink direction for the voice call. Therefore, the base station 102 may continue, and finish, setting up the voice call on the serving base station 102 using TDD. The final setup procedures may include the first UE 106 receiving a 200 OK Session Initiation Protocol (SIP) response via the base station 102, assuming the setup is successful (e.g., the dialed party answers the call and a session is established over a telecommunication network (e.g., an Internet Protocol Multimedia Subsystem (IMS) network).

Turning to the second UE 108 (UE-2), a user of the second UE 108 may initiate a MCPTT session, and, in response, the second UE 108 may initiate various setup procedures (e.g., signaling transmitted between the UE 108 and the base station 102) to setup the MCPTT session. At least some of these setup procedures may comprise a bearer setup, such as establishing a dedicated bearer (e.g., a dedicated EPS bearer), as described herein. During the setup of the communication session (e.g., during the bearer setup), the base station 102 and/or an associated system may determine a type of service associated with the communication session. In this example, since the second UE 108 is attempting to setup a MCPTT session, the type of service may be determined as a MCPTT type of service, which may be a predefined service in the set of predefined services that are considered to be "heavy uplink" services, or services that require high and reliable uplink throughput. In some embodiments, the base station 102 and/or an associated system may determine a QCI value or a 5QI value associated with the communication session, and may use the QCI/5QI value as a proxy for determining the type of service the second UE 108 is attempting to access. A QCI/5QI value of 65, for example, may correspond to MCPTT. Thus, since the QCI/5QI value of 65 matches a predefined value of the set of predefined values (e.g., 1, 2, and/or 65), a determination can be made that the second UE 108 is attempting to access one of the predefined services.

After determining that the second UE 108 is attempting to access MCPTT (which may be a predefined service in the set of predefined services), the base station 102 and/or an associated system may determine a value indicative of a quality associated with an uplink connection established by the second UE 108, and then determine whether the value satisfies a threshold value. In some embodiments, the value indicative of the uplink quality may comprise a SINR value associated with an uplink connection established by the second UE 108. In the example of FIG. 1, the second UE 108 is within a coverage area 114 associated with good (e.g., above-threshold) downlink (DL) quality but poor (e.g., below-threshold) uplink (UL) quality. For example, the base station 102 and/or an associated system may measure the SINR value associated with the uplink connection established by the second UE 108, and may determine that the SINR value does not satisfy a threshold SINR value (e.g., 15 dB). The SINR value associated with the uplink connection established by the second UE 108 may fail to satisfy the threshold SINR value in part because the second UE 108 is relatively far away from (beyond a threshold distance from) the base station 102. Because the value indicative of a quality associated with an uplink connection established by the second UE 108 fails to satisfy the threshold value, the MCPTT session may be transitioned 116 (or handed over) to the target base station 104 because the uplink quality in the coverage area 114 is insufficient for supporting the anticipated data rate in the uplink direction for the MCPTT session. In some embodiments, the base station 102 may send a command (e.g., a handover command) to cause the communication session associated with the second UE 108 to transition from the serving base station 102 to a target base station, such as the base station 104, to finish setting up the MCPTT session on the target base station 104 using FDD. The final setup procedures may include the second UE 108 receiving a 200 OK SIP response via the target base station 104, assuming the session is setup successfully. A communication session established on the target base station 104 using FDD may result in the second UE 108 being provided with good (e.g., above-threshold) downlink quality and good (e.g., above-threshold) uplink quality within the coverage area 118.

Turning to the third UE 110 (UE-3), a user of the third UE 110 may initiate a video (buffered streaming) session (e.g., by accessing a video streaming service, such as Youtube®, Netflix R, or the like), and, in response, the third UE 110 may initiate various setup procedures (e.g., signaling transmitted between the UE 110 and the base station 102) to setup the video (buffered streaming) session. At least some of these setup procedures may comprise a bearer setup, such as establishing a dedicated bearer (e.g., a dedicated EPS bearer), as described herein. During the setup (e.g., during the bearer setup), the base station 102 and/or an associated system may determine a type of service associated with the communication session. In this example, since the third UE 110 is attempting to setup a video (buffered streaming) session, the type of service may be determined as a video (buffered streaming) type of service, which may not be a predefined service in the set of predefined services that are considered to be "heavy uplink" services, or services that require high and reliable uplink throughput. That is, the set of predefined services may include, without limitation, conversational voice, conversational video (live streaming), and/or MCPTT, which happens to exclude video (buffered streaming). In some embodiments, the base station 102 and/or an associated system may determine a QCI value or a 5QI value associated with the communication session, and may use the QCI/5QI value as a proxy for determining the type of service the third UE 110 is attempting to access. A QCI/5QI value of 6, for example, may correspond to video (buffered streaming). Thus, since the QCI/5QI value of 6 does not match a predefined value of the set of predefined values (e.g., 1, 2, and/or 65), a determination can be made that the third UE 110 is attempting to access a service that is not included in the set of predefined services, and, hence, does not require a high and reliable uplink throughput.

After determining that the third UE 110 is attempting to access video (buffered streaming) (which may not be included in the set of predefined services), the base station 102 and/or an associated system may continue, and finish, setting up the video (buffered streaming) session on the serving base station 102 using TDD. The final setup procedures may include the third UE 110 receiving a 200 OK SIP response via the serving base station 102, assuming the session setup is successful. In the case of the third UE 110, there is no need to evaluate the uplink quality, because, even though the third UE 110 is located in the coverage area 114 associated with poor (e.g., below-threshold) uplink quality, since video (buffered streaming) does not require high and reliable uplink throughput to provide adequate QOS, the third UE 110 can establish the video (buffered streaming) session on the serving base station 102 using TDD, without degradation of QoS.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 2:
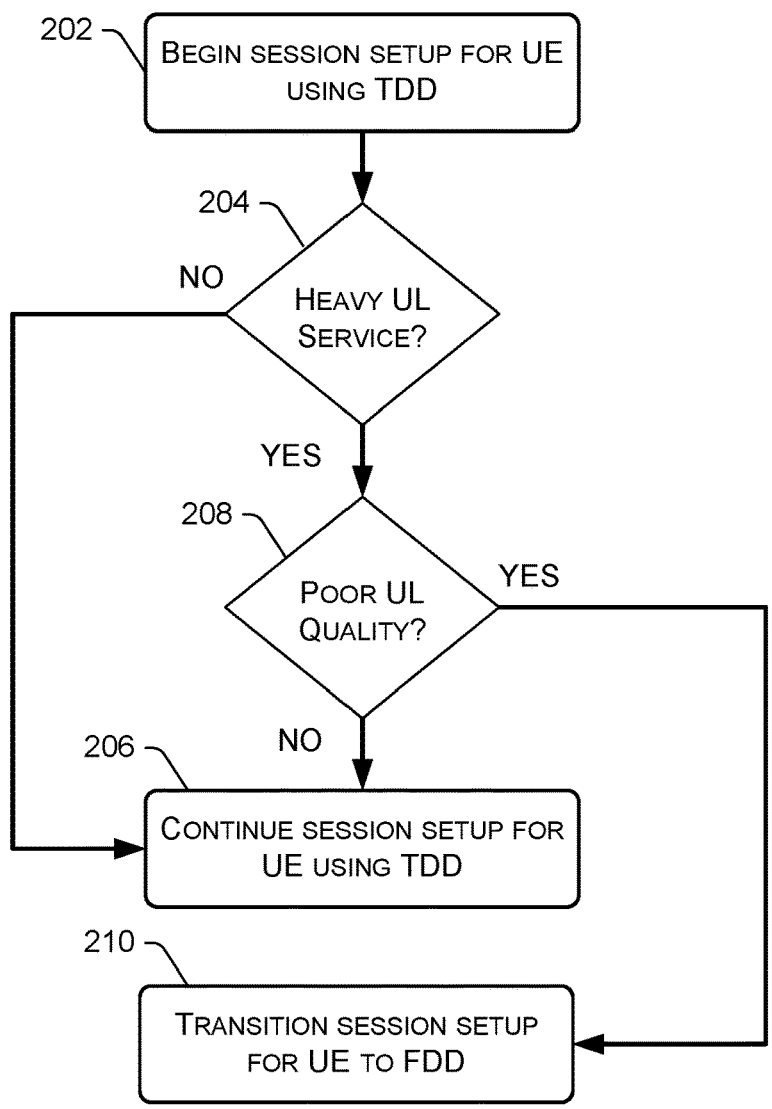
FIG. 2 illustrates a flowchart of an example process for selectively transitioning communication sessions from TDD to FDD based on service type and uplink quality, in accordance with various embodiments.

FIG. 2 illustrates a flowchart of an example process 200 for selectively transitioning communication sessions from TDD to FDD based on service type and uplink quality, in accordance with various embodiments. For discussion purposes, reference is made to the previous figure(s) in describing the process 200.

At 202, a base station 102 or an associated system may begin setting up a communication session for a UE using TDD. For example, the system may, at block 202, establish a dedicated bearer (e.g., a dedicated EPS bearer) as part of a bearer setup.

At 204, the base station 102 or an associated system may determine, during the setup, whether a type of service the UE is attempting to access is a "heavy uplink" service (e.g., a service that requires high and reliable uplink throughput), or a service with roughly the same data rates in both the uplink and downlink directions (e.g., ~50% of the data rate in the downlink direction, and ~50% of the data rate in the uplink direction). For example, at block 204, the base station 102 or an associated system may determine a type of service associated with the communication session, and may determine whether the type of service is a predefined service of a set of predefined services (e.g., conversational voice, conversational video (live streaming), and/or MCPTT). If, at block 204, it is determined that the type of service is not a predefined service of the set of predefined services considered to be "heavy uplink" services, the process 200 may follow the NO route from block 204 to block 206, where the base station 102 or an associated system may continue, and finish, setting up the communication session on the serving base station 102 using TDD. If, at block 204, it is determined that the type of service associated with the communication session is a predefined service of the set of predefined services considered to be "heavy uplink" services, the process 200 may follow the YES route from block 204 to block 208.

At 208, the base station 102 or an associated system may evaluate the uplink quality to determine whether the uplink quality is poor (e.g., below a threshold quality). For example, at block 208, the base station 102 or an associated system may determine a value indicative of a quality associated with an uplink connection established by the UE, and may determine whether the value satisfies a threshold value. If, at block 208, it is determined that the value indicative of the uplink quality satisfies the threshold value, this may indicate that the uplink quality is good (i.e., not poor), and the process 200 may follow the NO route from block 208 to block 206, where the base station 102 or an associated system may continue, and finish, setting up the communication session on the serving base station 102 using TDD. If, at block 208, it is determined that the value indicative of the uplink quality fails to satisfy the threshold value, this may indicate that the uplink quality is poor, and the process 200 may follow the YES route from block 208 to block 210.

At 210, the base station 102 or an associated system may transition (or handover), based at least in part on the value failing to satisfy the threshold value, the communication session to a target base station, such as the base station 104 of FIG. 1, to finish the setup using FDD. This provides the UE with high and reliable uplink throughput for the desired type of service.

Figure 3:
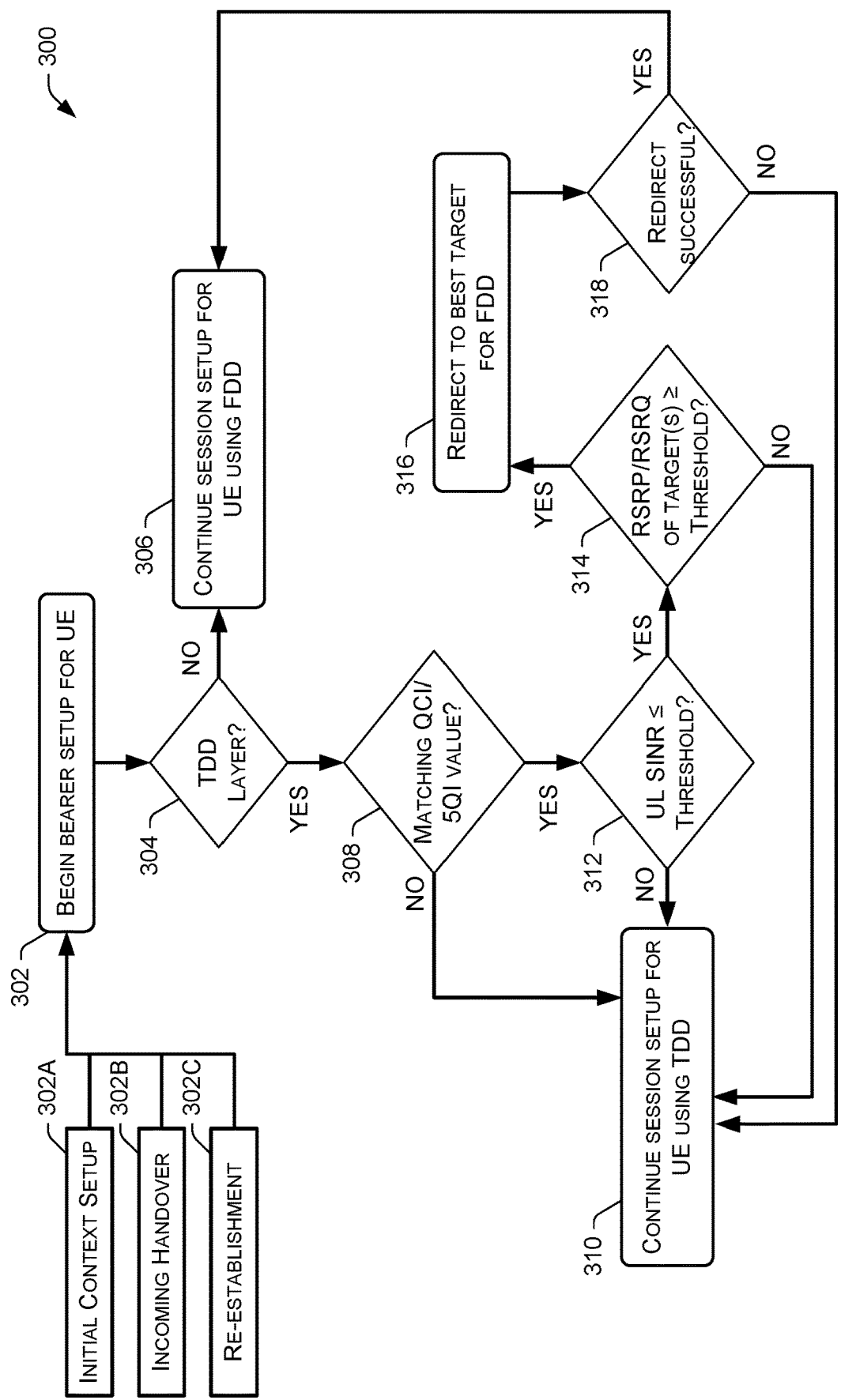
FIG. 3 illustrates a flowchart of another example process for selectively transitioning communication sessions from TDD to FDD based on service type and uplink quality, in accordance with various embodiments.

FIG. 3 illustrates a flowchart of another example process 300 for selectively transitioning communication sessions from TDD to FDD based on service type and uplink quality, in accordance with various embodiments. For discussion purposes, reference is made to the previous figures in describing the process 300.

At 302, a base station 102 or an associated system may begin a bearer setup for a communication session associated with a UE using TDD. For example, the system may, at block 302, establish a dedicated bearer (e.g., a dedicated EPS bearer) as part of the bearer setup, as described herein. FIG. 3 also indicates three example scenarios that may trigger the bearer setup at block 302 (which are also illustrated diagrammatically in FIGS. 4A-C, which are described in more detail below).

A first example scenario is an "initial context setup" scenario 302A, which may involve a request to establish a new communication session. For example, a user of the UE may dial a phone number (e.g., a 10 digit number in the United States) to establish a new conversational voice session (e.g., VOLTE, VONR, etc.) on a serving base station 102 using TDD. A second example scenario is an "incoming handover" scenario 302B, which may involve an incoming handover request of an existing communication session. For example, a user of a UE may be driving along a highway and may be transitioning out of range of an existing cell and within range of a new cell that utilizes TDD as the data transmission scheme at a particular frequency band (e.g., Band 41 in LTE, or the n41 band in 5G). A third example scenario is a "re-establishment" scenario 302C, which may involve a request to re-establish a failed communication session. For example, a user of an ongoing conversational voice call may have experienced a dropped call and the UE may initiate a re-establishment procedure to re-establish the failed conversational voice call on the serving base station 102 using TDD.

At 304, and during the bearer setup, the base station 102 or an associated system may determine whether the communication session is to be setup using TDD at a particular frequency band. In other words, the system may perform a check to determine whether the communication session being setup is on a TDD layer. For example, if the session being setup is on Band 41 (for LTE) or the n41 band (for 5G), the determination at block 304 may be in the affirmative, because these frequency bands use TDD as a data transmission scheme. If, at block 304, it is determined that the communication session is to be setup using FDD (as opposed to TDD), the process 300 may follow the NO route from block 304 to block 306, where the communication session may finish setting up using FDD. Otherwise, if, at block 304, it is determined that the communication session is to be setup using TDD at a particular frequency band, the process 300 may follow the YES route from block 304 to block 308.

At 308, the base station 102 or an associated system may determine at least one of a QCI value or a 5QI value associated with the communication session, and may determine whether at least one of the QCI value or the 5QI value matches a predefined value of a set of predefined values. For example, a set of predefined values may include, without limitation, the QCI/5QI values 1, 2, and/or 65. If, at block 308, it is determined that the QCI/5QI value associated with the communication session does not match a predefined value of the set of predefined values (e.g., if the QCI/5QI value is 6, and the set of predefined values include 1, 2, and 65), the process 300 may follow the NO route from block 308 to block 310, where the communication session may finish setting up using TDD, without evaluating the quality of the uplink connection established by the UE. In this scenario, the user of the UE might be establishing a session to browse the Internet (i.e., web browsing), or the user might be establishing a session to stream music or video from a streaming service, in which case the data rate in the uplink direction is expected to be relatively low (e.g., ~10-20% of the data transmission is expected to be sent in the uplink direction).

Otherwise, if, at block 308, it is determined that the QCI/5QI value associated with the communication session matches a predefined value of the set of predefined values (e.g., if the QCI/5QI value is 1, 2, or 65, and the set of predefined values include 1, 2, and 65), the process 300 may follow the YES route from block 308 to block 312. In this latter scenario, the user of the UE might be establishing a conversational voice call, a conversational video (live streaming) session, or a MCPTT session, in which case the data rate in the uplink direction is expected to be relatively high (e.g., 50% or more of the data transmission is expected to be sent in the uplink direction).

At 312, the base station 102 or an associated system may measure (or monitor) a signal-to-interference-plus-noise ratio (SINR) value associated with an uplink connection established by the UE, and may determine whether the SINR value satisfies a threshold SINR value (e.g., 15 dB). Measuring (or monitoring) the SINR value at block 312 may comprise the base station 102 measuring the SINR value itself, or the UE measuring the SINR value and reporting the SINR value to the base station 102. If, at block 312, it is determined that the uplink SINR value satisfies the threshold SINR value, the process 300 may follow the NO route from block 312 to block 310, where the communication session may finish setting up using TDD on the serving base station 102. In this scenario, although the UE is attempting to access a type of service that requires a high and reliable uplink throughput, the uplink quality is sufficient for providing the UE access to the service at an adequate QoS. Otherwise, if, at block 312, it is determined that the uplink SINR value does not satisfy the threshold SINR value, the process 300 may follow the YES route from block 312 to block 314.

At 314, the base station 102 or an associated system may identify one or more candidate target base stations (e.g., the base station 104 of FIG. 1) to which the communication session can be transitioned, may measure at least one of a reference signal received power (RSRP) value or a reference signal received quality (RSRQ) value associated with each candidate target base station, and may determine, for each candidate target base station, whether at least one of the RSRP value satisfies a threshold RSRP value or the RSRQ value satisfies a threshold RSRQ value. These candidate target base stations may be neighboring base stations that use FDD as a data transmission scheme. Accordingly, the serving base station 102 may maintain a neighbor list of these base stations.

Measuring the RSRP and/or RSRQ value is a way to evaluate whether any of the one or more candidate target base stations that are available for finishing the setup of the communication session using FDD are able to provide a sufficient uplink quality for the communication session. In some embodiments, event A5 is used at block 314 to evaluate an inter-frequency handover from TDD to FDD, and to prevent the communication session from being handed over to a poor-quality target FDD carrier. Said another way, the evaluation at block 314, which may use event A5, helps to ensure that, before the communication session is handed over to a target base station that uses FDD, there is at least one candidate target base station with a sufficient (e.g., above-threshold) quality or signal strength measurement. The evaluation at block 314 may involve evaluating a measured RSRP and/or RSRQ value of the serving base station 102 in addition to evaluating the same for the candidate target base station(s). In some embodiments, a threshold RSRP value of 124 dBm may be used in the evaluation at block 314. In some embodiments, measurement of the RSRP/RSRQ value at block 314 comprises the UE taking a radio signal measurements from one or more neighboring base stations, and sending the radio signal measurements in a measurement report to the serving base station 102. The serving base station 102, upon receipt of the measurement report, can evaluate the neighboring base stations as candidate target base stations to which the communication session can be handed over.

If, at block 314, there are no candidate target base stations that provide a RSRP value and/or a RSRQ value that satisfies an associated threshold, the process 300 may follow the NO route from block 314 to block 310, where the communication session may finish setting up using TDD. Otherwise, if at least one candidate target base station is identified with a RSRP value and/or a RSRQ value that satisfies an associated threshold, the process 300 may follow the YES route from block 314 to block 316.

At 316, the base station 102 or an associated system may redirect (transition, or handover) the communication session to the "best" target base station to finish the setup using FDD. If a single candidate target base station is identified and evaluated at block 314, the single base station may be selected, by default, as the "best" target base station due to there being no other candidate target base stations to choose from. If a plurality of candidate target base stations are identified that satisfy the RSRP/RSRQ threshold at block 314, any suitable selection logic can be utilized to select a "best" target for the inter-frequency handover. For example, the selection logic may select the candidate target base station with a highest/strongest RSRP value and/or RSRQ value measured at block 314. Other factors, such as carrier frequencies, capacity, and the like, may be considered in the selection of the target base station at block 316.

At 318, a determination may be made as to whether the redirection (transition, or handover) was successful. If, for some reason (e.g., due to poor radio conditions, a software bug, etc.), the redirection is unsuccessful, the process 300 may follow the NO route from block 318 to block 310, where the communication session may finish setting up using TDD. Otherwise, if the redirection (transition, or handover) is successful, the process 300 may follow the YES route from block 318 to block 306, where the communication session may finish setting up using FDD on the target base station, such as the base station 104 of FIG. 1. A UE that is transitioned from TDD to FDD using the process 300 may be provided with the high and reliable uplink throughput to help ensure that the UE can access the desired type of service at an adequate QoS.

FIGS. 4A-C illustrate example scenarios that can trigger a process for selectively transitioning a communication session from TDD to FDD, in accordance with various embodiments.

FIG. 4A illustrates a first scenario 400 (referred to herein as an "initial context setup" scenario 400), and it corresponds to block 302A of FIG. 3. In the initial context setup scenario 400 of FIG. 4A, a user 402 of a UE 404 may provide user input to the UE 404, which may cause the UE 404 to request establishment of a new communication session using TDD at a particular frequency band. For example, the UE 404 may connect to a nearby base station 102 at Band 41 for LTE or the n41 band for 5G NR, thereby requesting to setup the communication session using TDD. FIG. 4A illustrates an example where the communication session is an initial voice call 406, but it is to be appreciated that the session being setup can comprise any type of communication session besides a voice call. In this example, however, setup procedures may be initiated to setup the voice call (e.g., VOLTE, VONR, etc.), which may include procedures for a bearer setup. This can trigger the process 200 or the process 300, as described herein, whereby the base station 102 or an associated system evaluates the type of service (and potentially the uplink quality) to determine whether the communication session is to be transitioned from TDD to FDD.

FIG. 4B illustrates a second scenario 408 (referred to herein as an "incoming handover" scenario 408), and it corresponds to block 302B of FIG. 3. In the incoming handover scenario 408 of FIG. 4B, a user of a UE, at time, T1, and location, L1, may be driving in a car 410 while engaged in an ongoing communication session (e.g., a voice call 412). FIG. 4B illustrates an example where the communication session is a voice call 412, but it is to be appreciated that the ongoing session can comprise any type of communication session besides a voice call. The UE engaged in the ongoing voice call 412 may be connected to a serving base station 414 on a particular frequency band that uses FDD as the data transmission scheme (although TDD could also be utilized for the ongoing session). For example, the base station 414 may connect the UE on LTE Band 66 using FDD. At time, T2, the car 410 may be located at location, L2, where the UE is moving outside of the Band 66 coverage area provided by the base station 414 and is entering Band 41 coverage of a base station 102 that uses TDD as the data transmission scheme. Accordingly, the communication session (e.g., voice call 412) may be handed over to the base station 102 as an incoming handover voice call 416, which initiates a setup of the session (e.g., a bearer setup) via the base station 102 using TDD. This can trigger the process 200 or the process 300, as described herein, whereby the base station 102 or an associated system evaluates the type of service (and potentially the uplink quality) to determine whether the communication session is to be transitioned from TDD to FDD.

FIG. 4C illustrates a third scenario 418 (referred to herein as an "re-establishment" scenario 418), and it corresponds to block 302C of FIG. 3. In the re-establishment scenario 418 of FIG. 4C, the UE 404 may have been engaged in an communication session (e.g., a voice call) when the user 402 was relatively close to a serving base station 102 and the uplink quality was good (e.g., above-threshold). In this example, the user 402 may have carried the UE 404 farther from the serving base station 102 and the signal strength may have degraded to a point where the call is dropped. As shown in FIG. 4C, the UE 404 may attempt to re-establish the dropped session as a re-established voice call 420. FIG. 4C illustrates an example where the communication session is a re-established voice call 420, but it is to be appreciated that the session being re-established can comprise any type of communication session besides a voice call. The re-establishment may initiate a setup of the session to be re-established (e.g., a bearer setup). This can trigger the process 200 or the process 300, as described herein, whereby the base station 102 or an associated system evaluates the type of service (and potentially the uplink quality) to determine whether the communication session is to be transitioned from TDD to FDD.

Figure 5:
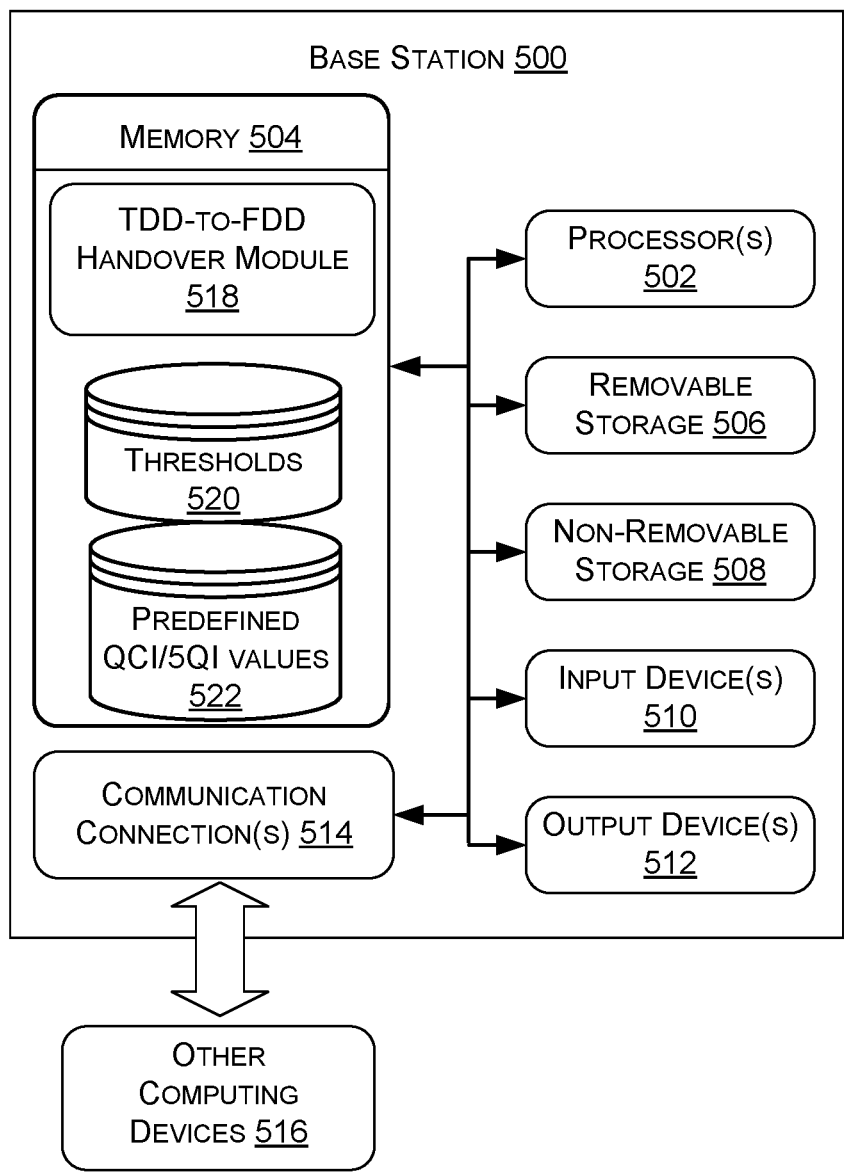
FIG. 5 is a block diagram of an example base station configured to perform the techniques and processes described herein, in accordance with various embodiments.

FIG. 5 is a block diagram of an example base station 500 configured to perform the techniques and processes described herein, in accordance with various embodiments. It is to be appreciated that, although a base station 500 is described as an example, this is merely one type of system that may perform the techniques and processes described herein, and that other systems (e.g., other network nodes) may be utilized in lieu of, or in addition to, a base station 500 for implementing the techniques and processes described herein. As shown in FIG. 5, the base station 500 may include one or more processors 502 and one or more forms of computer-readable memory 504. The base station 500 may also include additional storage devices. Such additional storage may include removable storage 506 and/or non-removable storage 508.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the base station 500. Any such computer-readable storage media may be part of the base station 500).

The base station 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The base station 500 may further include a communications interface(s) 514 that allows the base station 500 to communicate with other computing devices 516 (e.g., UEs, IMS nodes, etc.) such as via a network(s) (e.g., a telecommunications network, cellular network, and/or IMS network). The communications interface(s) 514 may facilitate transmitting and receiving wired and/or wireless signals over any suitable communications/data technology, standard, or protocol, as described herein. For example, the communications interface(s) 514 can comprise one or more of a cellular radio, a wireless (e.g., IEEE 802.1x-based) interface, a Bluetooth R; interface, and so on. In some embodiments, the communications interface(s) 514 may include radio frequency (RF) circuitry that allows the base station 500 to transition between different radio access technologies (RATs), such as transitioning between communication with a 5G NR RAT, a 4G LTE RAT and other legacy RATs (e.g., 3G/2G). The communications interface(s) 514 may further enable the base station 500 to communicate over circuit-switch domains and/or packet-switch domains.

In some embodiments, the computer-readable memory 504 may include a TDD-to-FDD handover module 518 configured to implement the techniques and processes described herein, such as selectively transitioning communication sessions from TDD to FDD based on type of service and uplink quality. Accordingly, the TDD-to-FDD handover module 518 may transmit and receive signals (e.g., SIP signals) and information or data to and from UEs and other network nodes (e.g., IMS nodes) for purposes of setting up a communication session, and for purposes of determining whether to transition (or handover) communication sessions from TDD to FDD. The TDD-to-FDD handover module 518 may further be configured to access thresholds 520, such as an uplink quality threshold(s) (e.g., SINR threshold(s)), RSRP threshold(s), and/or RSRQ threshold(s), as described herein. The TDD-to-FDD handover module 518 may further be configured to access predefined QCI and/or 5QI values 522 that corresponds to a set of predefined services, as described herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

The invention claimed is:

1. A computer-implemented method comprising:
   determining, by a serving base station, and during setup of a communication session for a user equipment (UE) using time-division duplexing (TDD), a Quality of Service Class Identifier (QCI) value associated with the communication session;
   determining, by the serving base station, that the QCI value matches a predefined value of a set of predefined values;
   measuring, by the serving base station, a signal-to-interference-plus-noise ratio (SINR) value associated with an uplink connection established by the UE;
   determining, by the serving base station, that the SINR value fails to satisfy a threshold SINR value; and
   transitioning, based at least in part on the SINR value failing to satisfy the threshold SINR value and the QCI value matching the predefined value of the set of predefined values, the communication session from the serving base station to a target base station to finish the setup using frequency-division duplexing (FDD).

2. The computer-implemented method of claim 1, wherein the setup comprises a bearer setup.

3. The computer-implemented method of claim 1, further comprising prior to the determining of the QCI value, determining that the communication session is at least one of:
   a request to establish a new communication session using TDD at a particular frequency band;
   an incoming handover request of an existing communication session that is to be handed over to the particular frequency band using TDD; or
   a request to re-establish a failed communication session using TDD at the particular frequency band.

4. A system comprising:
   a processor; and
   memory storing computer-executable instructions that, when executed by the processor, cause the system to:
      determine, during setup of a communication session for a user equipment (UE) using time-division duplexing (TDD), a type of service associated with the communication session, wherein determining the type of service comprises determining at least one of a Quality of Service Class Identifier (QCI) value or a 5G Quality of Service Identifier (5QI) value associated with the communication session;
      determine that the type of service is a predefined service of a set of predefined services based at least in part on determining that at least one of the QCI value or the 5QI value matches a predefined value of a set of predefined values;
      determine a value indicative of a quality associated with an uplink connection established by the UE;
      determine that the value fails to satisfy a threshold value; and
      transition, based at least in part on the value failing to satisfy the threshold value, the communication session to a target base station to finish the setup using frequency-division duplexing (FDD).

5. The system of claim 4, wherein:
   determining the value indicative of the quality associated with the uplink connection comprises measuring a signal-to-interference-plus-noise ratio (SINR) value associated with the uplink connection; and
   determining that the value fails to satisfy the threshold value comprises determining that the SINR value fails to satisfy a threshold SINR value.

6. The system of claim 4, wherein the setup comprises a bearer setup.

7. The system of claim 4, wherein the instructions, when executed by the processor, further cause the system to, prior to determining the type of service, determine that the communication session is to be setup using TDD at a particular frequency band.

8. The system of claim 4, wherein the transitioning is further based at least in part on a QCI value matching a predefined value of a set of predefined values.

9. The system of claim 4, wherein the setup is initiated based on at least one of:
 a request to establish a new communication session;
 an incoming handover request of an existing communication session; or
 a request to re-establish a failed communication session.

10. The system of claim 4, wherein the system comprises a serving base station, and wherein transitioning the communication session to the target base station comprises transitioning the communication session from the serving base station to the target base station.

11. A computer-implemented method comprising:
 determining, during setup of a communication session for a user equipment (UE) using time-division duplexing (TDD), a type of service associated with the communication session, wherein determining the type of service comprises determining at least one of a Quality of Service Class Identifier (QCI) value or a 5G Quality of Service Identifier (5QI) value associated with the communication session;
 determining that the type of service is a predefined service of a set of predefined services based at least in part on determining that at least one of the QCI value or the 5QI value matches a predefined value of a set of predefined values;
 determining a value indicative of a quality associated with an uplink connection established by the UE;
 determining that the value fails to satisfy a threshold value; and
 transitioning, based at least in part on the value failing to satisfy the threshold value, the communication session to a target base station to finish the setup using frequency-division duplexing (FDD).

12. The computer-implemented method of claim 11, wherein:
 the determining of the value indicative of the quality associated with the uplink connection comprises measuring a signal-to-interference-plus-noise ratio (SINR) value associated with the uplink connection; and
 the determining that the value fails to satisfy the threshold value comprises determining that the SINR value fails to satisfy a threshold SINR value.

13. The computer-implemented method of claim 11, wherein the setup comprises a bearer setup.

14. The computer-implemented method of claim 11, further comprising, prior to the determining of the type of service, determining that the communication session is to be setup using TDD at a particular frequency band.

15. The computer-implemented method of claim 11, wherein the transitioning is further based at least in part on a QCI value matching a predefined value of a set of predefined values.

16. The computer-implemented method of claim 11, wherein the setup is initiated based on at least one of:
 a request to establish a new communication session;
 an incoming handover request of an existing communication session; or
 a request to re-establish a failed communication session.

17. The computer-implemented method of claim 11, wherein the method is performed by a serving base station, and wherein the transitioning of the communication session to the target base station comprises transitioning the communication session from the serving base station to the target base station.

18. The computer-implemented method of claim 1, wherein the QCI value includes a scalar number from a list of scalar numbers.

19. The computer-implemented method of claim 18, wherein individual ones of the list of scalar numbers are associated with respective Packet Delay Budgets, respective Packet Loss Rage values, and respective QoS-related parameters.

20. The computer-implemented method of claim 1, wherein the predefined values include a range of values from 0 to 85.

* * * * *